(12) United States Patent
Natanzon et al.

(10) Patent No.: US 10,929,245 B1
(45) Date of Patent: Feb. 23, 2021

(54) FLEXIBLE SCHEDULER FOR BACKUPS

(71) Applicant: EMC IP Holding Company LLC, Hopkinton, MA (US)

(72) Inventors: Assaf Natanzon, Tel Aviv (IL); Amihai Savir, Sansana (IL); Oshry Ben-Harush, Kibutz Galon (IL); Anat Parush Tzur, Hanegev (IL); Ran Taig, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 318 days.

(21) Appl. No.: 15/282,873

(22) Filed: Sep. 30, 2016

(51) Int. Cl.
*G06F 11/14* (2006.01)
*G06Q 30/02* (2012.01)
*G06F 21/60* (2013.01)

(52) U.S. Cl.
CPC ...... *G06F 11/1461* (2013.01); *G06F 11/1448* (2013.01); *G06F 11/1464* (2013.01); *G06F 11/1466* (2013.01); *G06F 21/60* (2013.01); *G06Q 30/0283* (2013.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 8,280,824 B1* | 10/2012 | Vermeulen | ............. | G06Q 30/02 705/400 |
| 8,458,011 B2* | 6/2013 | Al-Dawsari | ........... | G06Q 10/06 705/400 |
| 8,713,376 B1* | 4/2014 | Makin | ................. | G06F 11/1451 707/654 |
| 2011/0154353 A1* | 6/2011 | Theroux | ............... | G06F 9/5038 718/104 |
| 2012/0109705 A1* | 5/2012 | Belady | ............. | G06Q 10/06312 705/7.22 |
| 2014/0279922 A1* | 9/2014 | Kottomtharayil | ....... | G06F 9/505 707/654 |
| 2016/0217384 A1* | 7/2016 | Leonard | ................. | G06F 17/18 |
| 2017/0011076 A1* | 1/2017 | Wang | ................... | G06F 9/5083 |

* cited by examiner

*Primary Examiner* — Aleksandr Kerzhner
*Assistant Examiner* — Eddy Cheung
(74) *Attorney, Agent, or Firm* — Womble Bond Dickinson (US) LLP (57) ABSTRACT

Flexible scheduling for backup jobs includes backup policies that allow for flexibility in scheduling execution time, and an automated data driven backup job execution scheduler. The scheduler balances load on the customer's and data protection system's resources using a dynamic pricing calculator that takes into account the real-time and predicted near-future status of the protection environment. The backup job scheduler includes a user interface that enables users to specify user-customized backup policies that enable flexibility in scheduling execution times and transparency in pricing.

15 Claims, 8 Drawing Sheets

FLEXIBLE SCHEDULER FOR BACKUPS

FIELD OF THE INVENTION

Embodiments of the present invention relate generally to data protection systems. More particularly, embodiments of the invention relate to scheduling backups in data protection systems.

BACKGROUND

Generating a backup of data is a commonly used technique in both on-premise and cloud-based data protection systems. Generally, customers request backup jobs to run at a specific time of the day based on strict backup policies that dictate a specific execution time, e.g. 8 PM daily.

Because backup servers serve a large number of independent customers that have common backup routines to meet similar operational needs, strict backup policies that dictate a specific execution time result in peak hours when the backup server is significantly busier than at other hours during the day. The surge in activity can make it difficult to meet customer demand and satisfy customer service level agreements.

New backup technologies like the Protect Point feature provided by © 2016 EMC Corporation can reduce the workload on the hosts by leveraging array snapshots of data. But such backup technologies can sometimes create extra loads on storage arrays. As a result, during some hours it can end up being more costly to execute the backup than it would using conventional backup technologies.

Changing the price structure for the amount charged to customers for backups can ameliorate the surge and balance the backup load to some degree. But pricing such time-shifted backups fairly and accurately can be difficult and can result in customer confusion. Altering the backup schedule can also decrease the performance of the customer's end user machines, or otherwise cause customer dissatisfaction with the level of service.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 7:
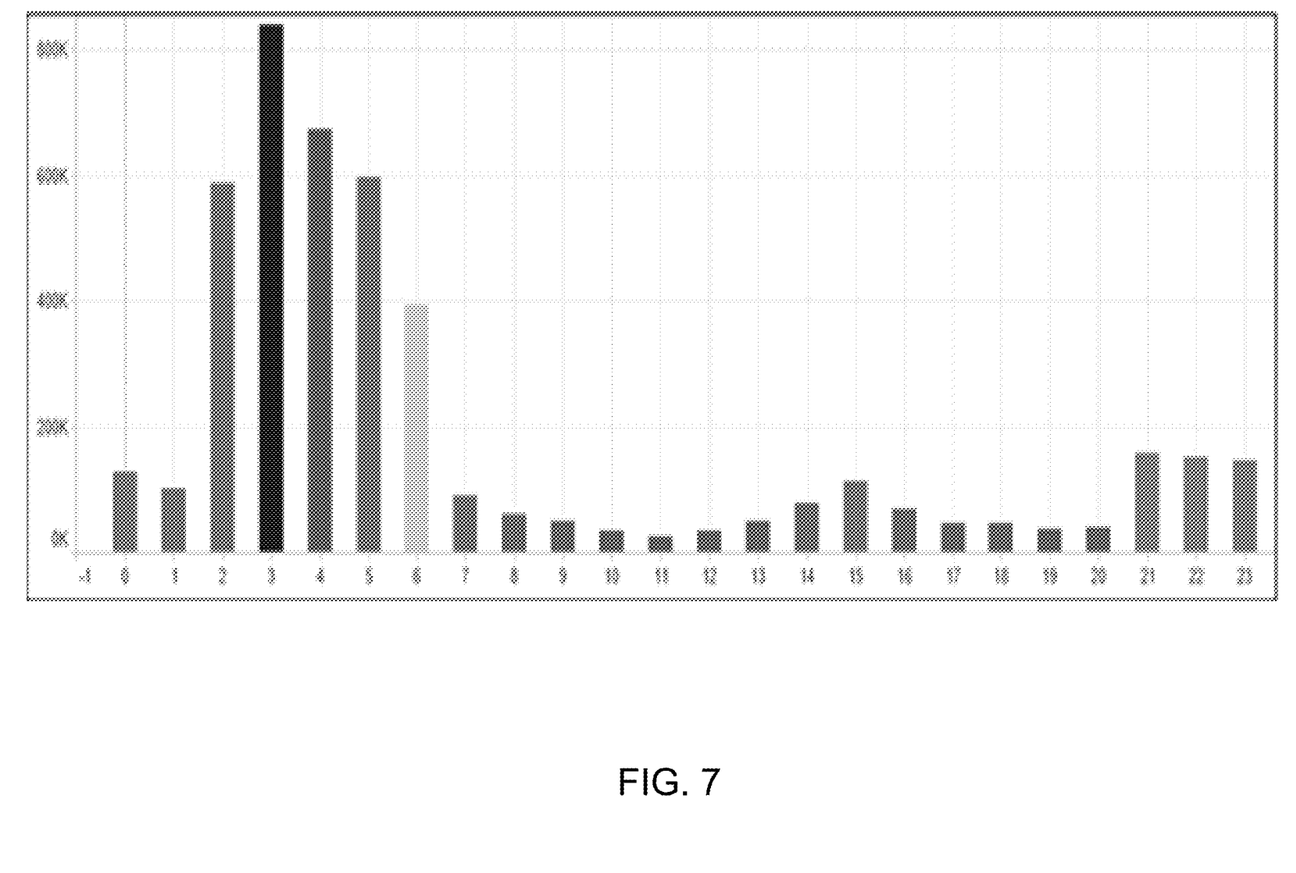
FIG. 7 is a chart diagram illustrating an exemplary historical data analysis of backup job executions along the hours of the day.

By analyzing historical records of backup job execution over significant period of time, the demand for backup jobs by different customers across the hours of the day reveals common usage patterns. For example, in the historical data analysis in FIG. 7, one can observe that the amount of executions varies along the hours of the day. Moreover, the system experiences a peak in usage 20% of the time (between 2-6 AM), whereas the rest of the time the usage is more conservative.

Figure 8:
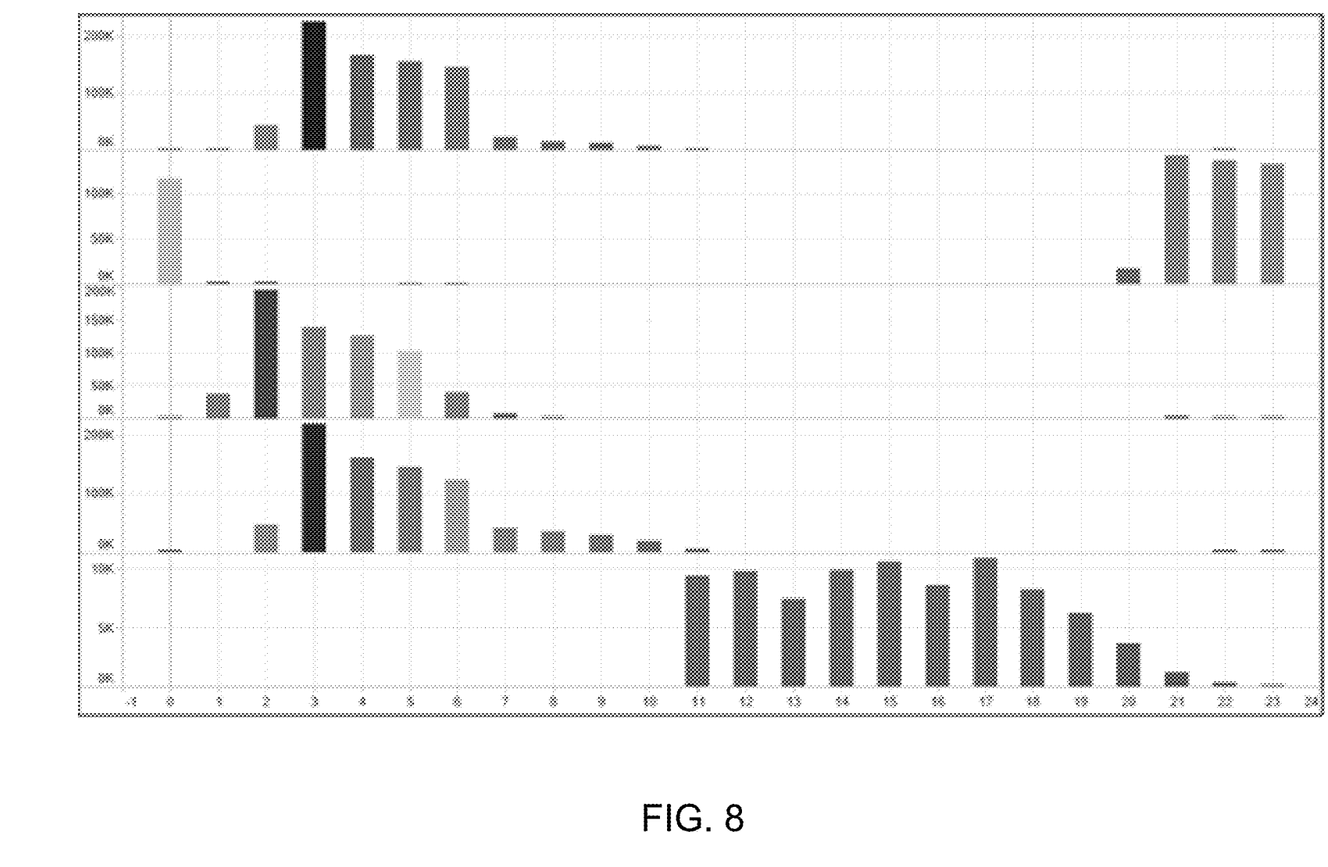
FIG. 8 is a chart diagram illustrating an exemplary historical data analysis of usage patterns of example backup servers along the hours of the day.

The historical data analysis in FIG. 8 reveals the usage patterns of four different backup servers. As one can observe, backup servers can each have their own distinctive usage pattern, suggesting that a fixed backup scheduling policy cannot meet the needs of every customer.

In view of the above observations, applying dynamic pricing might address the challenge of smoothing the peak usage times of backup servers. Additionally, attracting customers to the cloud environment and alternative cloud-based or even alternative premise-based backup products can alleviate some of the above-described problems with balancing the load imposed by current backup scheduling.

However, in order to persuade customers to make the change to the cloud environment and alternative backup products instead of the more conventional backup scheduling requires competitive pricing. For competitive pricing to be successful, the cloud resources devoted to customer backups require optimizing the use of cloud resources.

Moreover, since running a backup job can adversely affect the performance of the end user machines as well as the backup client, such as the above-described problems with excess loads on storage arrays, changing the way the customer schedules backup jobs can risk customer satisfaction with performance. In addition, customers want transparent pricing in order to understand charges for backup jobs.

Thus, in order to attract customers to work with the cloud environment and alternative backup job scheduling, it is important to reduce the impact of backup job execution on the performance, and the load on the storage systems, as well as to accurately price backups to recover costs.

To address the foregoing, embodiments of a data protection system having a flexible scheduler for backup jobs includes backup policies that allow for flexibility in scheduling execution time, and an automated data driven backup job execution scheduler.

In one embodiment, a backup job execution scheduler balances load on the customer's and data protection system's resources using a dynamic pricing calculator that takes into account the real-time and predicted near-future status of the protection environment. In one embodiment, the backup job scheduler includes a user interface that enables users to specify user-customized backup policies that enable flexibility in scheduling execution times and transparency in pricing.

In one embodiment, a data protection system having a flexible scheduler for backup jobs can be employed in both cloud-based and premise-based data protection environments to conserve resources and minimize cost to the service provider and customer alike. For example, backups that must be scheduled strictly during high demand hours will cost the customer more, while backups that can be flexibly scheduled, or that are scheduled for non-rush hours (of either backup or non-backup) will cost less.

In one embodiment, a data protection system having a flexible scheduler for backup jobs includes a process for configuring flexible backup policies, a dynamic pricing model, and an intelligent data driven scheduler. The data protection system having a flexible scheduler for backup jobs described herein enables storage service providers to enhance customer satisfaction in using cloud-based data protection environments and backup products, including providing customers with the flexibility to enjoy a fully automated scheduler for backup jobs, as well as to optimally utilize their infrastructure.

Figure 1:
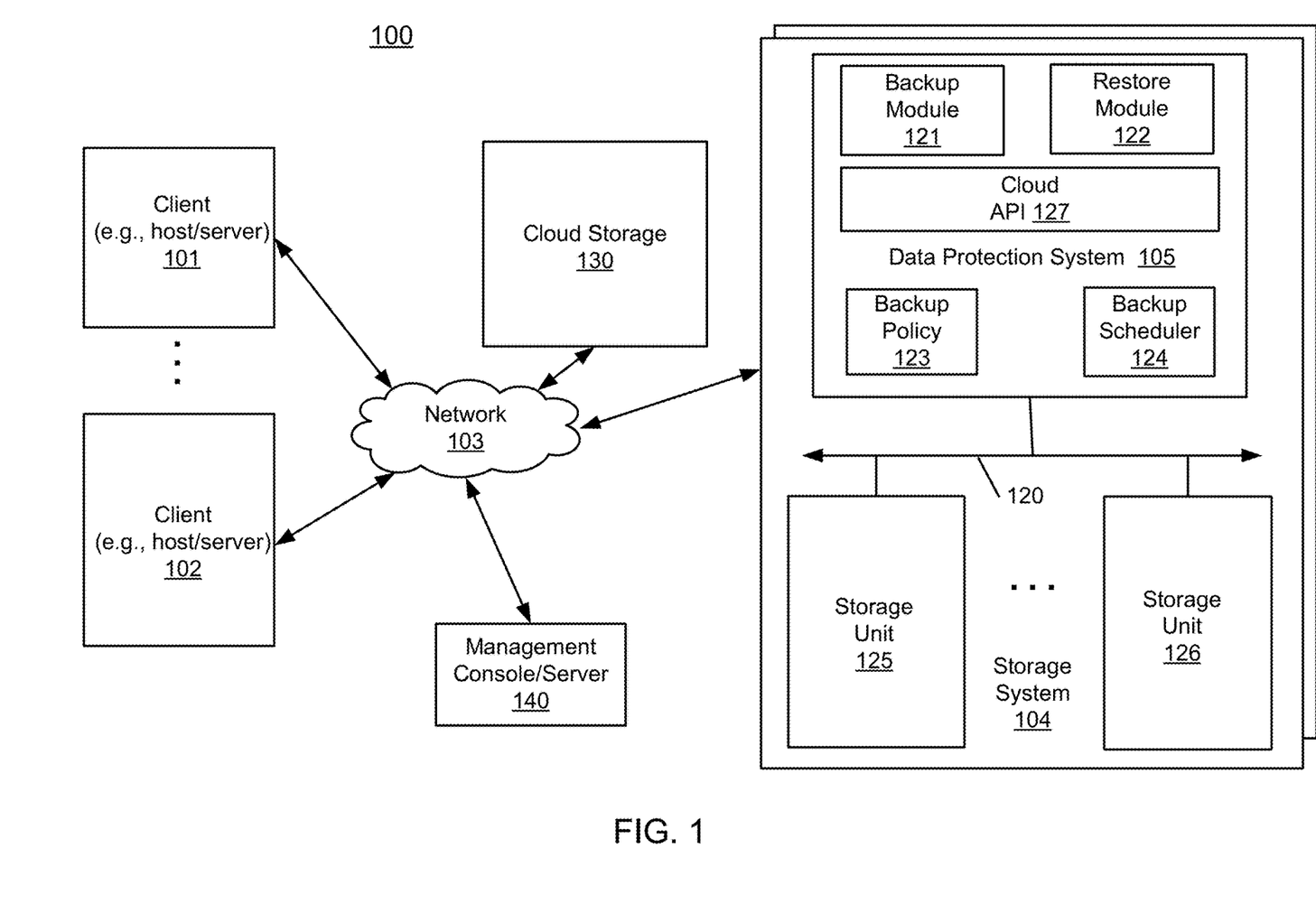
FIG. 1 is a block diagram illustrating an overview of an operating environment of a data protection system according to one embodiment of the invention.

FIG. 1 is a block diagram illustrating a system 100 in which a data protection system 105 is configured with a flexible backup scheduler 124 and flexible backup policy 123 according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, data protection system 105 (also referred to as data protection logic, data protection manager, etc. which may be implemented in software, hardware, or a combination thereof), including a flexible backup policy repository 123 and flexible backup scheduler logic 124 communicatively coupled to a cloud storage application programming interface (API) 127, and backup and restore modules 121/122 and one or more storage units or devices 125-126.

Storage system 104 may represent any storage service related components configured or adapted to provide storage services (e.g., storage as a service) to a variety of clients using any of the access protocols set forth above. For example, storage system 104 may include the backup module 121, restore module 122 and cloud API 127, for providing storage services for cloud-enabled storage 130, including backing up and restoring data stored in the cloud.

In one embodiment, backup logic 121 is configured to receive and back up data from a client (e.g., clients 101-102) and to store the backup data in any one or more of storage units 125/126 or in a cloud storage 130. Restore logic 122 is configured to retrieve and restore/reconstruct backup data from any one or more of storage units 125/126, or from cloud storage 130 in conjunction with cloud API 127 as explained in further detail below. The restored/reconstructed data is sent back to a client (e.g., clients 101-102).

Storage units 125/126 may be implemented locally (e.g., single node operating environment) or remotely (e.g., multi-node operating environment) via interconnect 120, which may be a bus and/or a network (e.g., a storage network or a network similar to network 103). Storage units 125/126 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 125/126 may be located locally or remotely accessible over a network, including being located in cloud-enabled storage 130.

In one embodiment, the flexible backup scheduler component 124 of data protection system 105 contains logic to monitor resource utilization for assessing the real-time status of the data protection system as well as logic to model near-future status of the data protection system, a dynamic pricing calculator to provide accurate costs for scheduling backups and dynamic pricing of same, all of which is described in further detail with reference to FIG. 2. The flexible backup policy component 123 of data protection system 105 is configured by customers via a graphical user interface component (not shown) to specify customer preferences for flexible backup scheduling and pricing, all of which is also described in further detail with reference to FIGS. 2 and 3.

In one embodiment, storage system 104 further includes a storage manager or storage controller (not shown) configured to manage storage resources of storage system 104, such as, for example, storage space and processing resources (e.g., processor, memory, network resources) in addition to the aforementioned data protection system 105, flexible backup policy 123 and flexible backup scheduler 124. An administrator of management console or server 140 may access the storage manager or controller as well as the backup policy and scheduler components remotely via a management or configuration interface (not shown).

In addition to interacting with the backup scheduling features described herein of the data protection system 105, flexible backup policy 123 and flexible backup scheduler 124, the administrator can provision and manage primary and protection storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
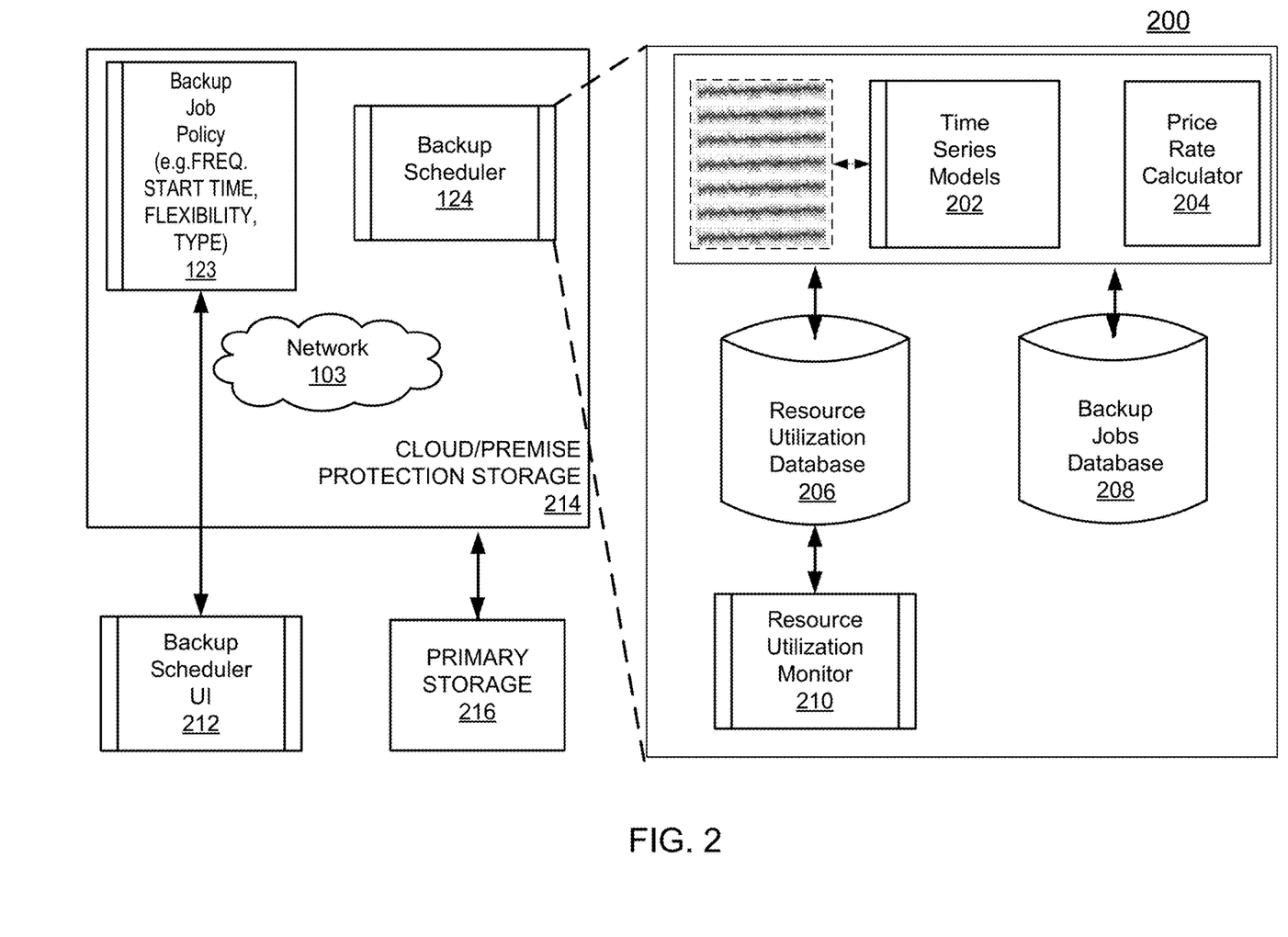
FIG. 2 is a block diagram illustrating an overview of components of a flexible scheduler for backups in a data protection system in further detail according to one embodiment of the invention.

FIG. 2 is a block diagram illustrating further details of a data protection system 200 configured with a flexible backup scheduler 124 and flexible backup policy 123. As shown in the illustrated embodiment, cloud or premise-based protection storage 214 is accessible over network 103 for backing up a primary storage 216 in accordance with a current backup job policy repository 123. For each backup job a customer defines a flexible, or soft, backup policy on the backup job policy repository via a backup scheduler user interface (UI) 212, as will be described in further detail in FIG. 3. Rather than defining a fixed time slot, backup job policy 123 will allow customers a degree of freedom in selecting, through the backup scheduler UI 212, an exact time or range of execution times at which their backup job is scheduled in accordance with a current price rate calculated for backup jobs.

In one embodiment, the backup scheduler 124 comprises resource utilization monitor logic 210, price rate calculator logic 204 and time series models 202 operating in communication with a resource utilization database 206 and backup jobs database 208.

In one embodiment, the resource utilization database 206 enables resource utilization monitor 210 to monitor utilization of data protection system resources in real time. For example, each operating environment's infrastructure contains different key performance indicators such as CPU usage, memory utilization, network traffic, storage capacity that can be used to determine the status of the operating environment, whether cloud or premise-based, in real time.

In one embodiment, the time series models 202 enable the resource monitor logic 210 to also predict the status of the operating environment in the near future time. For example, the time series models 202 can be applied to historical data about the operating environment, such as historical data collected in the resource utilization database 206 and scheduled backup jobs in the backup jobs database 208, to discover trends and seasonality patterns in the resource usage and anticipated backup job requirements of different customers.

In one embodiment, different time series models 202 can be employed, and include such well-known time series models such as Holt-Winter forecasting model, a type of exponential smoothing model for forecasting behavior, or an autoregressive integrated moving average (ARIMA) forecasting model. The models are fitted to time series data collected over time, such as historical data recorded as a series of data points at successive points in time, usually at regular intervals. The time series models 204 are applied to the historical data recorded for the particular operating environment, such as that recorded in the resource utilization database 206, and the model predicts the expected resource utilization in the future, including the near-future time periods of interest to the backup scheduler 124.

In one embodiment, the price rate calculator 204 calculates a customer's expected charges for a backup job based on the actual and predicted resource availability during the requested backup time period and the type of backup requested. For example, the price for a backup job with strict scheduling constraints during a period of high resource utilization, e.g. the "rush hour," will be expensive. But if the user selects a flexible backup policy allowing a shift of 2 hours in the backup scheduling window (e.g., FLEXIBILITY=2H), that could result in a lower charge and savings to the customer while enabling the service provider to schedule all backup jobs for all customers in the data protection environment more cost-effectively.

Figure 3:
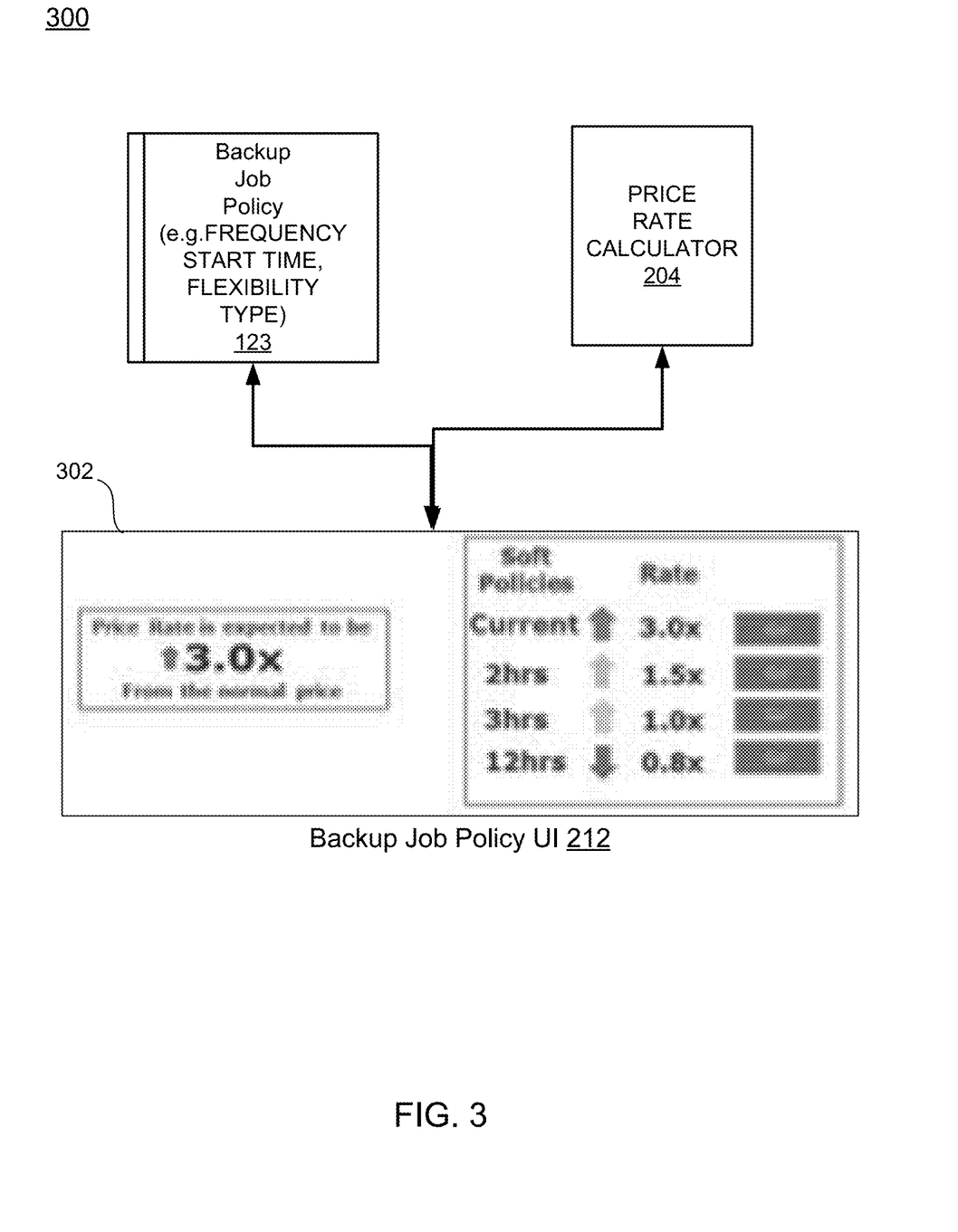
FIG. 3 is a block diagram illustrating an overview of components of a flexible scheduler for backups in a data protection system in further detail according to one embodiment of the invention.

FIG. 3 is a block diagram overview illustrating the operation of the backup job policy 123, price rate calculator 204 and backup job policy UI 212 components in further detail. In one embodiment, the backup job policy UI 212 provides a customer with a user interface to the features of flexible backup job scheduling. The backup job policy UI 212 incorporates input from the price rate calculator 204. As described with reference to FIG. 2, the price rate calculator 204 calculates a customer's expected charges for a backup job based on the actual and predicted resource availability during the requested backup time period and the type of backup requested.

For example, one or more backup jobs can be defined in accordance with settings in the backup job policy 123 as follows (FREQ, START_TIME, FLEXIBILITY, TYPE), where FREQ=daily; START_TIME=9:00 AM; FLEXIBILITY=5H; TYPE=differential. The example settings cause the backup scheduler to run a differential backup every day at 9:00 AM with permission to shift up to 5 hours. More specifically, the backup job can be executed between the hours of 9:00 AM to 2:00 PM. By way of example only, as shown in the backup job policy UI 212, if the shift of the backup job is at least a 12 hour window, the dynamic pricing of the backup job can decrease to as much as 0.8× of normal pricing. If the shift of the backup job is at least 3 hours, the backup job will be priced at no more than 1.0× of regular pricing. Shorter time window shifting is available at a premium of 1.5× the regular price for a 2 hour window and 3× the regular price for a strict time schedule (no flexible scheduling window).

Figure 4:
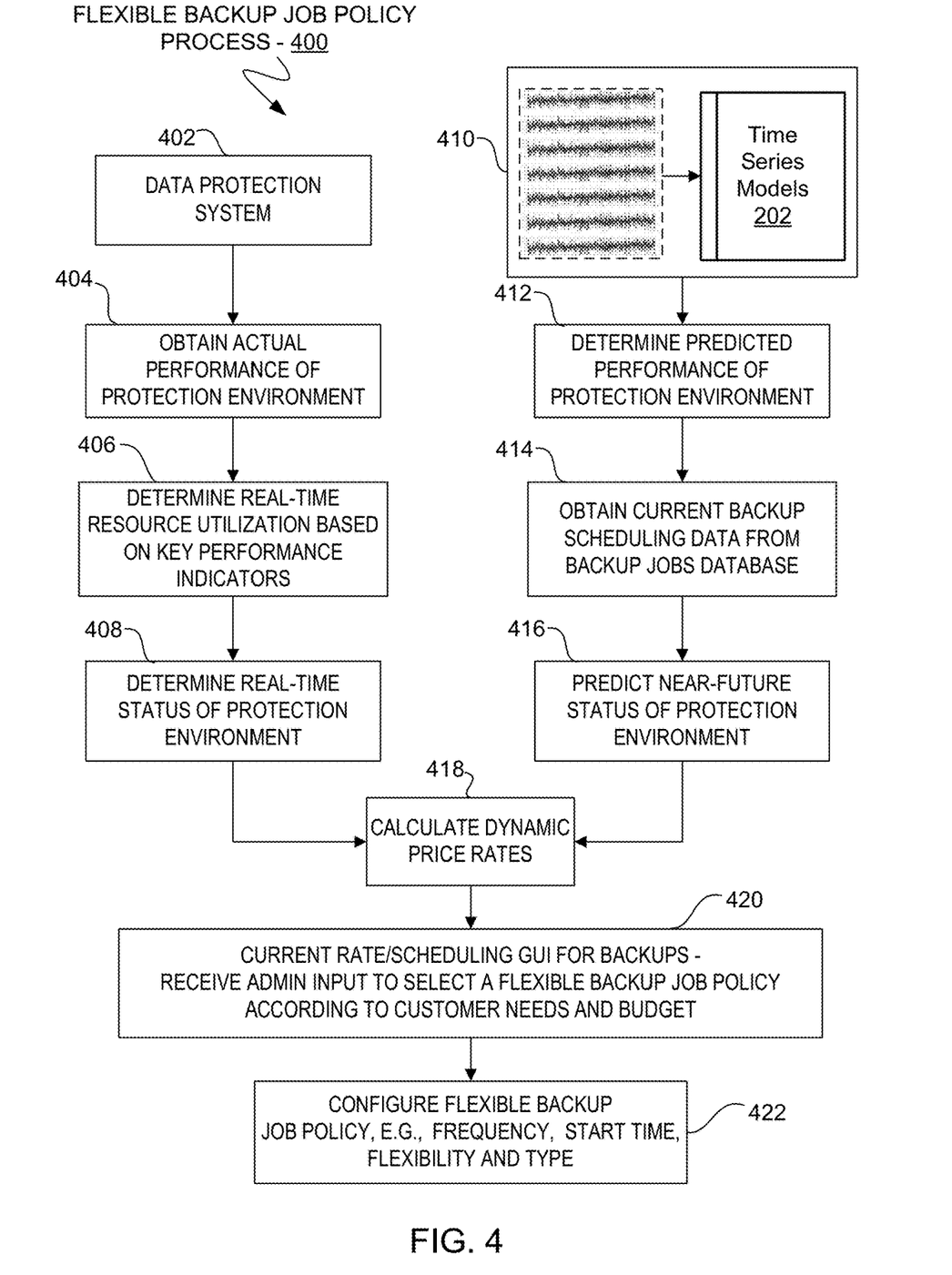
FIGS. 4-5 are flow diagrams illustrating processes for a flexible scheduler for backups in a data protection system according to one embodiment of the invention.
Figure 5:
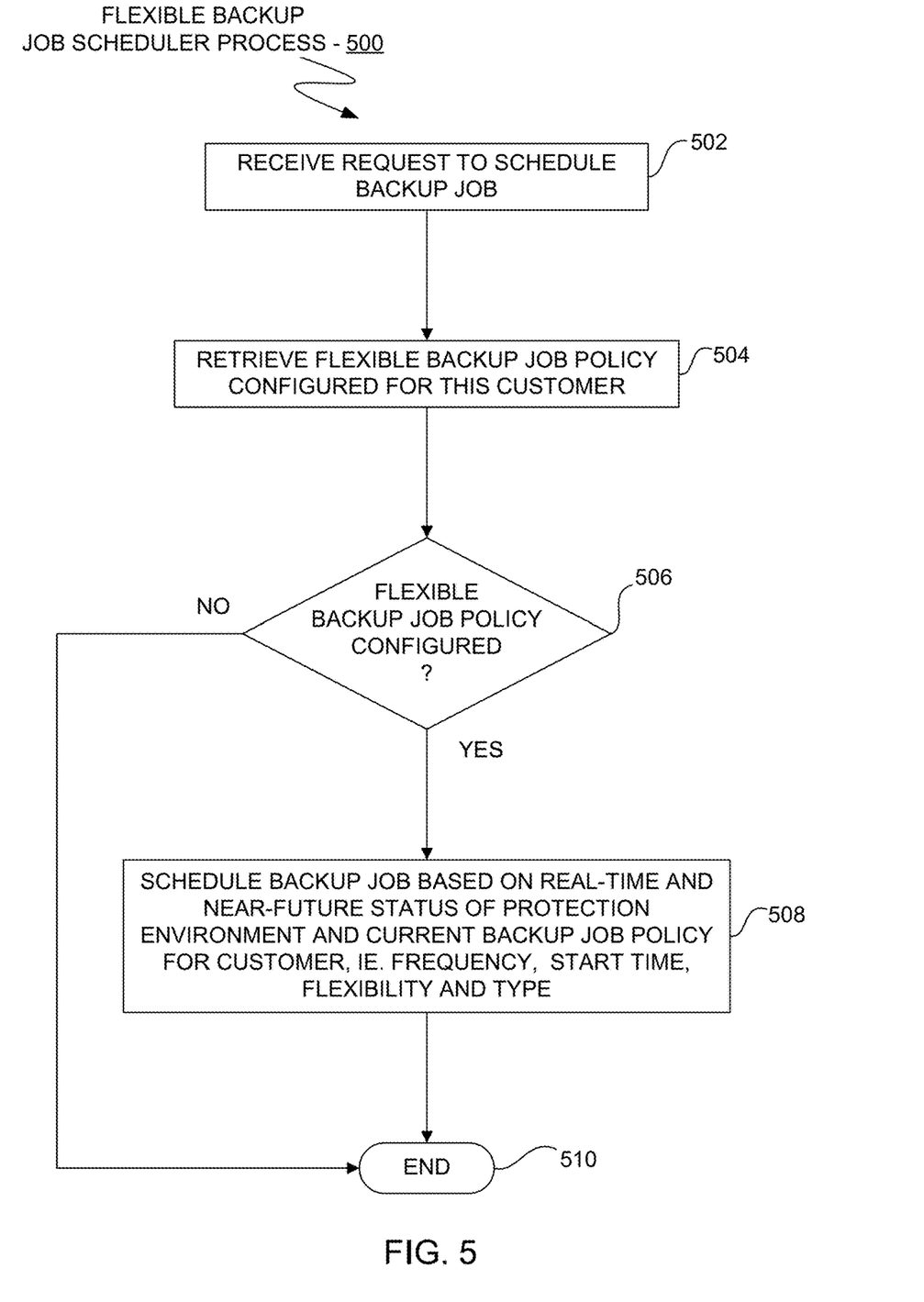

FIGS. 4-5 are flow diagrams illustrating processes 400/500 for flexible backup job policy processes 400 and flexible backup job scheduler processes 500. Processes 400/500 may be performed by processing logic that includes hardware (e.g. circuitry, dedicated logic, etc.), software (e.g., embodied on a non-transitory computer readable medium), or a combination thereof. For example, the data protection system 105, including components of the flexible backup scheduler logic 124, flexible backup scheduler UI 212, cloud API 127, backup and restore modules 121/122 and other components as illustrated in FIG. 1 through FIG. 3, can perform processes 400/500, and can be embodied in hardware or software or a combination thereof.

With reference to the embodiment of processes illustrated in FIG. 4, the process 400 to configure a flexible backup job policy begins at 402 in which the data protection system obtains 404 actual performance information about the data protection environment in which backup jobs are executed, and at 406 determines the real-time resource utilization based on certain key performance indicators. For example, the real-time performance information may be obtained through the above-described resource utilization monitor 210 operating in conjunction with the resource utilization database 206. At 408, the process 400 uses this information to determine the real-time status of the protection environment. Meanwhile, at 410, a time series model 202 is used at 412 to determine predicted performance of the protection environment, including, at 414, obtaining the current backup schedule data for backup jobs database 208 as described above with reference to FIG. 2.

In one embodiment, process 400 continues at 418 to calculate dynamic price rates based on the real-time and predicted status of the protection environment, and at 420 the process presents the dynamic price rates to customers through a graphical user interface, such as the backup scheduler UI 212 described with reference to FIG. 2 and FIG. 3. Once the customer input to the UI is received, at 422 the process 400 concludes by configuring the flexible backup job policy parameters, e.g. FREQ, START TIME, FLEX and TYPE as described with reference to the backup job policy repository 123 described in FIG. 2.

With reference to the embodiment of processes illustrated in FIG. 5, a flexible backup job scheduler process 500 begins at 502 by receiving a request to schedule a backup job. In response to the request, at 504 the process 500 retrieves the flexible backup job policy configured for the customer. At decision block 506, the process 500 determines whether there is a flexible time window configured for this customer and/or this backup job. If so, then at 508 the process 500 proceeds to schedule the backup job based on the real-time and near-future status of the protection environment, as well as the current backup job policy configured for the customer, including the configured frequency, start time, flexibility and type.

Figure 6:
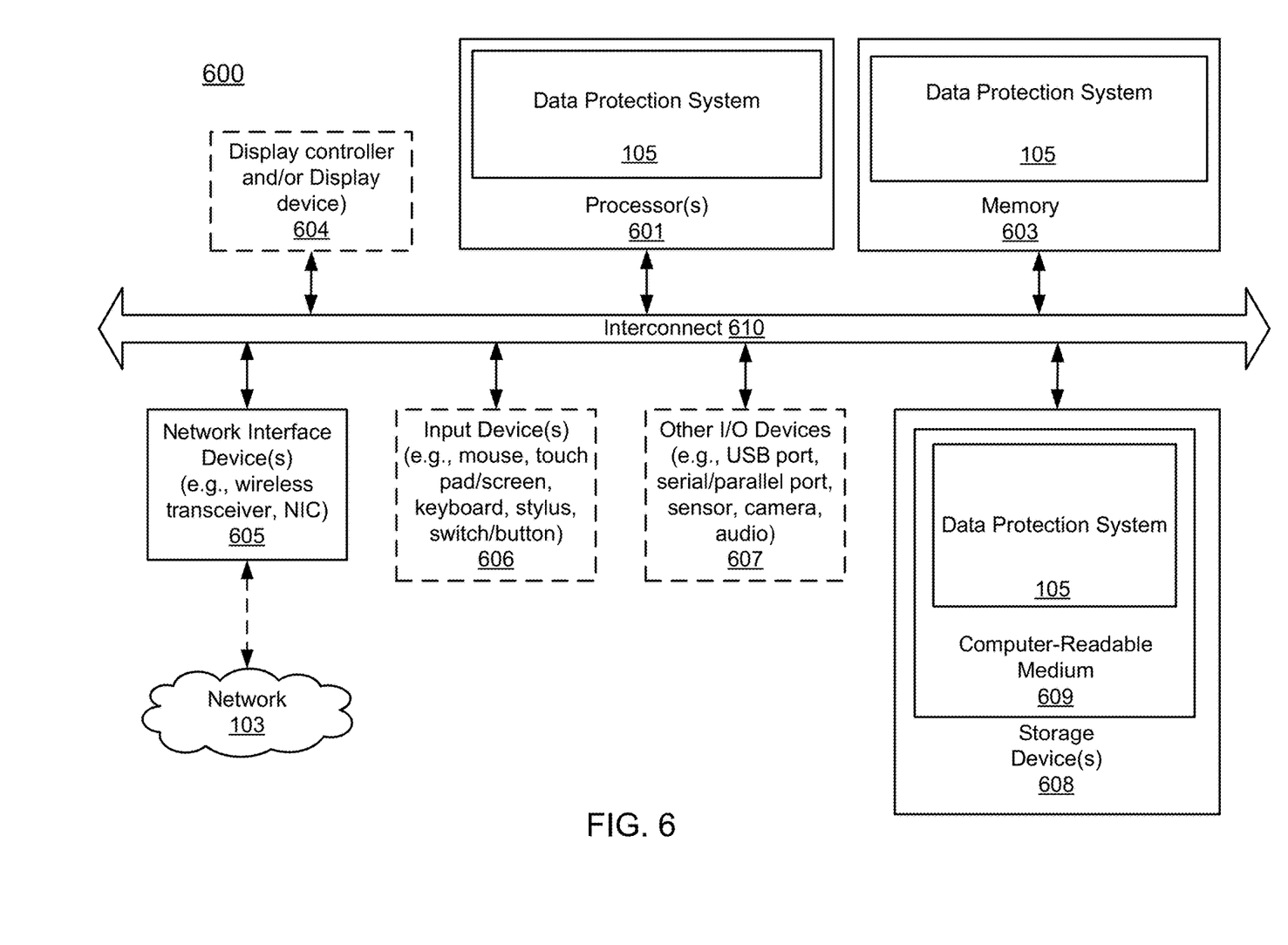
FIG. 6 is a block diagram illustrating a general overview of a data processing system environment for providing a flexible scheduler for backups in a data protection system according to one embodiment of the invention.

FIG. 6 is a block diagram illustrating an example of a data processing system 600 that may be used with one embodiment of the invention. For example, system 600 represents any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 600 may further include IO devices such as devices 605-608, including network interface device(s) 605, optional input device(s) 606, and other optional IO device(s) 605. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., module, unit, and/or logic of any of the components of data protection system 105 and/or storage system 104) embodying any one or more of the methodologies or functions described herein. Module/unit/logic 104/105 may also reside, completely or at least partially, within memory 603 and/or within processor 601 during execution thereof by data processing system 600, memory 603 and processor 601 also constituting machine-accessible storage media. Module/unit/logic 104/105 may further be transmitted or received over a network via network interface device 605.

Computer-readable storage medium 609 may also be used to store the some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic of the storage system and data protection systems 104/105, components and other features described herein can be implemented as discrete hardware components or integrated in the functionality of hardware components such as ASICS, FPGAs, DSPs or similar devices. In addition, module/unit/logic 104/105 can be implemented as firmware or functional circuitry within hardware devices. Further, module/unit/logic 104/105 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems that have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for flexible backup scheduling in a data protection environment, the method comprising:
   determining a real-time status of a data protection environment;
   determining a predicted status of the data protection environment;
   calculating an expected dynamic price rate for scheduling a backup job based on the determined real-time and predicted statuses of the data protection environment;
   presenting a graphical user interface including a plurality of dynamic price rates based on a FLEX parameter of a backup job policy associated with the plurality of dynamic price rates, the plurality of dynamic price rates comprising at least a first dynamic price rate calculated based on a first value of the FLEX parameter and a second dynamic price rate calculated based on a second value of the FLEX parameter, wherein the first dynamic price rate is calculated based on the expected dynamic price rate and the first value of the FLEX parameter, wherein the second dynamic price rate is calculated based on the expected dynamic price rate and the second value of the FLEX parameter, and wherein the FLEX parameter indicates a time within a plus or a minus time shift from a selected one from a plurality of values of the FLEX parameter to start the backup job, wherein a START TIME parameter indicates a start time for the backup job without the time shift;
   receiving a user input for a selected one of a plurality of flexible backup schedules that is associated with one of the dynamic price rates for the backup job;
   configuring the backup job policy including the START TIME parameter and the FLEX parameter based on the received selection, wherein the start time for the backup job is determined based on the START TIME parameter and the FLEX parameter; and
   pricing the backup job in accordance with the selected flexible backup schedule.

2. A computer-implemented method for flexible backup scheduling of claim 1, the method further comprising:
   applying a time series model to historical data for the data protection environment, the historical data including data values for resource utilization of the data protection environment and data values for backup jobs scheduled in the data protection environment, the data values recorded over time; and
   determining the predicted status of the data protection environment in accordance with the application of the time series model to the historical data, including a near-future predicted status of the data protection environment.

3. The computer-implemented method for flexible backup scheduling of claim 2, wherein the time series model is any one or more of an exponential smoothing model and an autoregressive integrated moving average (ARIMA) model.

4. The computer-implemented method for flexible backup scheduling of claim 1, further comprising:
   obtaining real-time performance of the data protection environment, including real-time resource utilization based on key performance indicators; and
   determining the real-time status of a data protection environment based on the real-time performance.

5. The computer-implemented method for flexible backup scheduling of claim 1, wherein the backup job policy further includes any one of a frequency and a type parameter, the method further comprising:
   tagging the backup job with the one of the calculated dynamic price rates that is associated with the selected one of the plurality of flexible backup schedules responsive to receiving the user input.

6. A data processing system operating in a data protection environment, comprising:
   a policy repository to store one or more backup job policies for scheduling backup jobs that create backups of primary storage in protection storage in a data protection environment;
   a processor in communication with the policy repository, the processor configured to:
      determine a real-time status of the data protection environment;
      determine a predicted status of the data protection environment;
      calculate an expected dynamic price rate for scheduling a backup job based on the determined real-time and predicted statuses of the data protection environment;
      present a graphical user interface including a plurality of dynamic price rates based on a FLEX parameter of a backup job policy associated with the plurality of dynamic price rates, the plurality of dynamic price rates comprising at least a first dynamic price rate calculated based on a first value of the FLEX parameter and a second dynamic price rate calculated based on a second value of the FLEX parameter, wherein the first dynamic price rate is calculated based on the expected dynamic price rate and the first value of the FLEX parameter, wherein the second dynamic price rate is calculated based on the expected dynamic price rate and the second value of the FLEX parameter, and wherein the FLEX parameter indicates a time within a plus or a minus time shift from a selected one from a plurality of values of the FLEX parameter to start the backup job, wherein a START TIME parameter indicates a start time for the backup job without the time shift;
      receive a user input for a selected one of a plurality of the flexible backup schedules that is associated with one of the dynamic price rates for the backup job;
      configure the backup job policy including the START TIME parameter and the FLEX parameter based on the received selection, wherein the start time for the backup job is determined based on the START TIME parameter and the FLEX parameter; and price the backup job in accordance with the selected flexible backup schedules.

7. The data processing system of claim 6, wherein the processor is further configured to:

apply a time series model to historical data for the data protection environment, the historical data including data values for resource utilization in the data protection environment and data values for backup jobs scheduled in the data protection environment, the data values having been recorded over time; and determine the predicted status of the data protection environment in accordance with the application of the time series model to the historical data, including a near-future predicted status of the data protection environment.

8. The data processing system of claim 7, wherein the time series model is any one or more of an exponential smoothing model and an autoregressive integrated moving average (ARIMA) model.

9. The data processing system of claim 6, wherein the processor is further configured to:

obtain real-time performance of the data protection environment, including real-time resource utilization based on key performance indicators; and determine the real-time status of a data protection environment based on the real-time performance.

10. The data processing system of claim 6, further comprising a display interface in communication with the processor and the policy repository, wherein the flexibility window is a scheduling window for the start time, and wherein the backup job policy includes any one of a frequency and a type parameter, the processor further configured to:

tag the backup job with the one of the calculated dynamic price rates that is associated with the selected one of the plurality of flexible backup schedules responsive to receiving the user input.

11. A non-transitory computer-readable storage medium having instructions stored therein, which when executed by a processor, cause the processor to perform operations for flexible backup scheduling in a data protection environment, the operations comprising:

determine a real-time status of a data protection environment;

determine a predicted status of the data protection environment;

calculate an expected dynamic price rate for scheduling a backup job based on the determined real-time and predicted statuses of the data protection environment;

present a graphical user interface including a plurality of dynamic price rates based on a FLEX parameter of a backup job policy associated with the plurality of dynamic price rates, the plurality of dynamic price rates comprising at least a first dynamic price rate calculated based on a first value of the FLEX parameter and a second dynamic price rate calculated based on a second value of the FLEX parameter, wherein the first dynamic price rate is calculated based on the expected dynamic price rate and the first value of the FLEX parameter, wherein the second dynamic price rate is calculated based on the expected dynamic price rate and the second value of the FLEX parameter, and wherein the FLEX parameter indicates a time within a plus or a minus time shift from a selected one from a plurality of values of the FLEX parameter to start the backup job, wherein a START TIME parameter indicates a start time for the backup job without the time shift;

receive a user input for a selected one of a plurality of flexible backup schedule schedules that is associated with one of the dynamic price rate for the backup job;

configure the backup job policy including the START TIME parameter and the FLEX parameter based on the received selection, wherein the start time for the backup job is determined based on the START TIME parameter and the FLEX parameter; and price the backup job in accordance with the selected flexible backup schedules.

12. The non-transitory computer-readable storage medium of claim 11, the operations further comprising:

apply a time series model to historical data for the data protection environment, the historical data including data values for resource utilization of the data protection environment and data values for backup jobs scheduled in the data protection environment, the data values recorded over time; and determine the predicted status of the data protection environment in accordance with the application of the time series model to the historical data, including a near-future predicted status of the data protection environment.

13. The non-transitory computer-readable storage medium of claim 12, wherein the time series model is any one or more of an exponential smoothing model and an autoregressive integrated moving average (ARIMA) model.

14. The non-transitory computer-readable storage medium of claim 11, the operations further comprising:

obtain real-time performance of the data protection environment, including real-time resource utilization based on key performance indicators; and determine the real-time status of a data protection environment based on the real-time performance.

15. The non-transitory computer-readable storage medium of claim 11, wherein the flexibility window is a flexible scheduling window for the start time, and wherein the backup job policy further includes any one of a frequency and a type parameter, the operations further comprising:

tag the backup job with the one of the calculated dynamic price rates that is associated with the selected one of the plurality of flexible backup schedules responsive to receiving the user input.

* * * * *

UNITED STATES PATENT AND TRADEMARK OFFICE
CERTIFICATE OF CORRECTION

PATENT NO. : 10,929,245 B1  
APPLICATION NO. : 15/282873  
DATED : February 23, 2021  
INVENTOR(S) : Assaf Natanzon et al.

Page 1 of 1

It is certified that error appears in the above-identified patent and that said Letters Patent is hereby corrected as shown below:

In the Claims

Claim 6, Column 12, Line 64, "the flexible backup schedules that is associated with" delete the word "the" before the word "flexible"

Claim 6, Column 13, Line 5, "flexible backup schedules" delete the "s" in "schedules"

Claim 11, Column 14, Line 14, "flexible backup schedule schedules that is associated" delete the word "schedule" before the word "schedules"

Claim 11, Column 14, Line 22, "flexible backup schedules" delete the "s" in "schedules"

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*